United States Patent [19]

Scharp

[11] 3,946,122

[45] Mar. 23, 1976

[54] PROCESS OF PREPARING MARGARINE PRODUCTS

[75] Inventor: Jacob Arie Scharp, Vlaardingen, Netherlands

[73] Assignee: Lever Brothers Company, New York, N.Y.

[22] Filed: Jan. 14, 1974

[21] Appl. No.: 433,170

Related U.S. Application Data

[63] Continuation of Ser. No. 178,513, Sept. 7, 1971, abandoned, which is a continuation-in-part of Ser. No. 780,897, Dec. 3, 1968, abandoned.

[30] Foreign Application Priority Data

Dec. 4, 1967 Luxemburg............................ 55012

[52] U.S. Cl. ............................................... 426/604
[51] Int. Cl.²............................................ A23D 3/02
[58] Field of Search ........... 426/339, 340, 341, 195, 426/194, 604

[56] References Cited

UNITED STATES PATENTS

| 2,024,647 | 12/1935 | Joyce ................................. 426/339 |
| 2,919,196 | 12/1959 | Duin et al. ........................... 426/340 |
| 3,026,207 | 3/1962 | Murray et al. ....................... 426/200 |
| 3,457,086 | 7/1969 | Josefowicz et al. ................. 426/195 |
| 3,519,436 | 7/1970 | Bouer et al. ..................... 426/340 X |

FOREIGN PATENTS OR APPLICATIONS

| 405,116 | 2/1934 | United Kingdom |
| 1,005,802 | 9/1965 | United Kingdom |

*Primary Examiner*—Joseph M. Golian
*Attorney, Agent, or Firm*—Kenneth F. Dusyn; James J. Farrell

[57] ABSTRACT

A butter-like plastic food spread is based on an emulsion in which a proportion of the aqueous composition constituting the continuous phase is maintained in the disperse phase constituted by the fat, which is at least partly crystallised. This effect is produced by the presence of an emulsifier system in the emulsion which while stabilising the emulsion, permits a limited degree of destabilisation when the emulsion is cooled at rest in the preparation of the product, which closely resembles butter in consistency.

3 Claims, No Drawings

PROCESS OF PREPARING MARGARINE PRODUCTS

This application is a continuation of application Ser. No. 178,513, filed Sept. 7, 1971, now abandoned, which in turn is a continuation-in-part of application Ser. No. 780,897, filed Dec. 3, 1968, also now abandoned.

The present invention relates to food spreads containing fat and to processes for their preparation, and especially relates to the production of a margarine-like food spread having improved consistency, as far as plasticity and elasticity are concerned, in its resemblance to butter.

Consumer tests have shown that, other things being equal, the more the plasticity and elasticity of food spreads such as margarine resemble those of butter, the more the product is valued.

Margarine is commonly prepared by chilling in a closed tubular surface scraped heat exchanger an emulsion containing about 80% by weight of fat, in which an aqueous component, e.g. milk, is dispersed. During chilling and scraping many small crystal nuclei form, so that ultimately at least part of the fat blend is in the form of very small crystals. The chilled emulsion may be subsequently treated in a resting tube, where crystallisation continues and thereafter the margarine may be shaped and packed. At the moment of packing the product may resemble butter more or less closely in its consistency, according to the fat selected, but post-crystallisation may occur, impairing the elasticity and plasticity of the final product by the formation of a crystal network.

It is also possible to prepare margarine in a manner analogous to the preparation of butter, by starting from an emulsion resembling cream containing 40–60% by weight of fat dispensed in the aqueous phase. This is cooled to 12°–16°C. and ripened and churned, as in butter manufacture. The effect of the churning is to bring about phase inversion, so that the aqueous component is dispersed in the fat, and to express any surplus aqueous phase as "buttermilk".

Since this buttermilk cannot be re-used because of the risk of microbiological contamination, it is uneconomic to start with a "cream" containing 40 – 60% of fat, as in conventional butter-making and it is preferable instead to start with a cream containing the same amount of fat as that required in the margarine product, i.e. about 80%. In either case, however, the product undergoes post-crystallisation during storage as in the case of margarine prepared in the previously described method, with the result that a change to a less butter-like consistency occurs. This change is only partly reduced by using as the fat phase a fat blend which has been interesterified with the object of avoiding post-crystallisation.

The plastic food spread of this invention comprises a substantially unworked cooled emulsion comprising 70 – 90% by weight of fat, having dilatatic values at 25°C. of from 100 – 400 mm$^3$/25 g., which is dispersed together with a proportion of an aqueous component of the spread in a continuous phase constituted by the remainder of the aqueous component.

The food spread of the present invention is prepared from an emulsion of fat dispersed in an aqueous component, and still contains part of the aqueous component as the continuous phase.

Although the food spread of this invention very probably has another physical structure than butter, it shows butter-like elasticity and plasticity characteristics, even on prolonged storage at ambient temperatures.

The unique structure of this novel food spread is obtained without working by means of an emulsifier system providing an emulsion which is partly destabilised upon cooling to crystallise the fat. It is essential to avoid any substantial working of the emulsion containing an emulsifier system with these properties, otherwise phase inversion occurs and the butter-like properties characterising the product are lost.

The invention also provides a method for the manufacture of a plastic food spread as described, in which an emulsion containing the emulsifier system is prepared by dispersing the melted fat in an aqueous phase and cooling the emulsion at rest to a temperature at which at least 5% of the fat crystallises and a destabilisation degree of 0.15 – 0.75 is obtained as hereinafter defined.

Although the spread still contains a continuous aqueous phase, part of the aqueous component is probably enclosed in clusters of fat crystals in the dispersed phase.

The degree of destabilisation can be calculated from the relative electrical conductivity values before and after destabilisation, since that part of the aqueous component in the disperse phase is not available for conducting electricity.

The degree of destabilisation may therefore be defined as:

$$\text{degree of destabilisation} = \frac{R\ C\ \text{before} - R\ C\ \text{after}}{R\ C\ \text{before}}$$

in which R C before = relative conductivity before destabilisation and R C after = relative conductivity after destabilisation. The relative conductivity is the ratio of the specific conductivities of the emulsion and its aqueous phase at the same temperature.

The specific conductivity of the aqueous phase and of the product can be determined with a conventional conductivity cell containing electrodes.

Since the conductivity of the product is markedly changed as a result of phase inversion, any working of the product caused by the insertion of the electrodes into it should be avoided as far as possible. Preferably therefore knife-edged electrodes, e.g. not more than about 0.1 mm wide, are inserted edgewise into the product. Alternatively the specific conductivity of the product may also be determined by a cell containing electrodes and inserted into the emulsion before the spread is formed by chilling the emulsion, thus eliminating the effect of working of the product when the electrodes are inserted into the spread. The relative conductivity values of the product obtained from this test, however, are somewhat higher than those obtained by the previous method, on which the degree of destabilisation specified in the accompanying claims is based.

The magnitude of this difference is mainly related to the hardness of the product, as measured in g/cm$^2$ by the method of Haighton, described in J.Am. Oil Chem. Soc. 36 (1959) pp. 345–348, in accordance with the equation:

$$\text{difference in \%} = \frac{3}{200} \times \text{hardness} + 4$$

The relative conductivity of the emulsion before destabilisation can be easily calculated from the specific conductivity values of the emulsion and its aqueous phase at a temperature at which the emulsion is not yet destabilised, i.e. at a temperature before the fat commences crystallisation.

The aqueous phase of a spread can be obtained by melting it and its emulsion may be obtained by re-emulsifying the melt in the aqueous phase.

The degree of destabilisation should not be so slight that a negligible amount of the aqueous component is transferred during cooling of the emulsion to the disperse phase, nor on the other hand should it be so great that phase inversion, i.e. aggregation of the fat particles in the disperse phase to form a continuous fat phase, takes place.

The emulsifier system should therefore be capable of performing two functions:
1. Stabilising the fatty emulsion, especially during preparation and further treatments e.g. homogenization as well as any heat treatment to kill microorganisms;
2. Maintaining the food spread in the destabilised condition, produced by cooling.

These two functions may be combined in a single emulsifier, but more commonly the emulsifier system comprises one or more emulsifiers for each of the above functions.

The emulsifier system in the products of the invention is capable of maintaining a degree of destabilisation of 0.15 – 0.75 for a prolonged period i.e. 4 weeks or more in the unworked spread stored at a temperature of from 15°– 25°C., and preferably 0.3 – 0.6, more particularly about 0.5.

Preferably the emulsifier system includes at least one derivative of a fatty acid or alcohol containing 10 – 24 carbon atoms in the alkyl group, more preferably a saturated fatty acid or alcohol having 16 – 24 carbon atoms, since such emulsifiers may be suitable to perform both the functions of stabilising the emulsion during preparation and maintaining the spread in a destabilised condition. For the latter purpose at least the emulsifier system preferably comprises a nonionic emulsifier having an HLB factor of 12.0 – 18.0 or 3.5 – 7.0.

The action of destabilising emulsifiers can be easily demonstrated by a churning test. This test can be carried out as follows:

An oil-in-water emulsion containing 70 – 90% fat is diluted at a temperature above the melting point of the fat to a fat content of 40%. This emulsion is cooled until the major part of the fat is crystallised, and the dispersion obtained is churned. After churning the fat is flocculated if the emulsion is unsuitable as the destabilising emulsifier, but otherwise remains in suspension.

Suitable destabilising emulsifiers include glycerol or sorbitan monoesters or a polyoxyethylene derivative thereof, or polyoxyethylene monoesters, eg. glycerol monostearate, sorbitan monopalmitate, sorbitan monostearate, polyoxyethylene sorbitan monostearate or polyoxyethylene monostearate.

Monoglycerides, especially those derived from palmitic acid or stearic acid, are the preferred destabilising emulsifiers of the class of emulsifiers having HLB factors of from 3.5 – 7.0. Commercial monoglycerides used in this invention should preferably contain at least 90% of monoglycerides, the remainder consisting chiefly of di- and triglycerides.

An HLB factor of 11.0 – 18.0 is adequate when the purpose of the emulsifier is stabilisation only. The HLB factors are determined either by measurement or calculation as described in J. Soc. Cosm. Chem., 1 (1949), No. 5, pages 311 – 326.

Suitable nonionic stabilising emulsifiers having an HLB factor of 11 – 18 include eg. a polyoxyethylene sorbitan or polyoxyethylene ester or ether or a polyglycerol ester or ether. Examples of these classes of emulsifiers are: decaglycerol monolaurate, polyoxyethylene sorbitan monolaurate, polyoxyethylene monostearate, or stearyl alcohol ethylene oxide ether. The last two emulsifiers mentioned and also the polyoxyethylene sorbitan monostearate are dual-effect emulsifiers capable of performing both the stabilising and the destabilising action. Anionic emulsifiers having a stabilising action, which may be used in the compositions of the invention, include sodium oleate, and partial citric acid esters of monoglycerides of fatty acids containing at least 14 carbon atoms. The monoglycerides may be derived from naturally occurring glycerides, eg. soybean oil.

Further suitable stabilising emulsifiers include proteinaceous colloids, e.g. phospho-proteins. The phospho-protein emulsifiers may comprise e.g. the alkaline salts of phospho-proteins or complexes of phosphatides with phosphoproteins. Preferably lipoprotein complexes as present in egg-yolk or buttermilk and the alkaline salt of phospho-proteins e.g. caseinate, may be used. If egg-yolk is used as a stabilising emulsifier, it must not be denatured e.g. by previous heat treatment. Preferably therefore it is used in a fresh condition, but it can also be used in a preserved state, e.g. by the addition of salt, provided that it is not denatured.

If alkali caseinate is used, it is preferred to use sodium caseinate, which is preferably made in situ in the aqueous phase from skimmed milk by the addition of calcium ion sequestering agent in the form of a sodium salt, e.g. sodium citrate, condensed phosphates, e.g. sodium tripolyphosphate, sodium tartrate or the sodium salt of ethylene diamine tetra acetic acid. the emulsifier system should be present in the food spread in minor quantities, e.g. from 0.1 – 10% by weight, based on the total emulsion.

Preferably the stabilising emulsifiers are used in quantities of 0.1 – 5%, e.g. egg-yolk 1 – 5%, preferably 1.5 – 3% and sodium caseinate 0.1 – 1%, preferably 0.2 – 0.5%.

The destabilising emulsifiers are preferably used in quantities of 0.25 – 1% by weight, e.g. 0.3 – 0.6% of glycerol monostearate as destabilising emulsifier, with 0.2 – 0.5% of sodium caseinate as the stabilising emulsifier. The fat in the plastic food spread according to the invention may comprise one or more fatty acid triglycerides which may be of either animal or vegetable origin or both and may include normally liquid fat in a blend.

In general all fats and glyceride oils suitable for margarine preparation can be applied in the food spread of the present invention, and still result in a butter-like behavior of the final product.

In order to obtain a food spread of the desired structure, the dilatation value of the fat used should preferably be from 100 – 400 mm$^3$/25 g. at 25°C.; more preferably the dilatations of the fat should also be from 200 – 1,000 mm$^3$/25 g at 5°C. The dilatation values of the fat blend described in this specification are determined by the method described in H.A. Boekenoogen, "Analysis and characteristics of oils, fats and fat products", Vol. 1, 1964, pages 143 – 145.

The fat in the plastic food spread of the invention may be selected, as in margarine, to confer particular properties to the spread, eg. to provide a cool-tasting effect by a steep dilatation curve, to provide spreadability at low temperatures or to give special dietetic characteristics, eg. by the presence in the fat of components having a high essential acid content.

The fat blends for the latter type of food spreads include a substantial amount of a vegetable oil containing at least 40% by weight of polyunsaturated fatty acids, especially the essential fatty acids. These acids are believed to be dietetically advantageous. An important fatty acid of the group of essential fatty acids is: cis-9, cis-12, octa-decadienoic acid, contained in safflower, cottonseed, wheat germ, soyabean, grapeseed, poppyseed, tobaccoseed, walnut, corn and especially sunflower oil. The latter is produced in large quantities and has an excellent taste due to good oxidation stability. Preferably the compositions of the present invention contain about 15% to about 70% by weight of a fat which is a vegetable oil of which at least 40% of its fatty acid content is cis-9, cis-12-octadecadienoic acid.

A particular advantage of the present invention is that it includes a food spread based on a blend of butter oil and vegetable oils rich in polyunsaturated fatty acids. The resulting product, which closely resembles butter in consistency and also in composition, is also superior in containing more polyunsaturated fatty acid than natural butter.

Excellent products have been prepared from fat blends comprising 80 – 50% of butter oil and 20 – 50% of such vegetable oils.

In order to avoid contamination of the food spread with micro-organisms it is desirable to maintain a pH value below 7 in the aqueous component. For this purpose, the aqueous component can be made acid before the emulsion is prepared by the addition of lactic acid, citric acid or other suitable acids or by the addition of bacteria by means of which lactic acid is formed in situ.

It may further be necessary to adjust the pH to a value at which particular emulsifiers present in the emulsifier system are effective. Thus sodium caseinate must be maintained in a medium of pH 5.5 – 7.0, egg-yolk at 4.0 – 7.0 and anionic synthetic emulsifiers in general should of course be maintained at an acid pH value sufficient for ionization.

The product is preferably further protected against micro-biological contamination by subjecting it to sterilization treatment or by pasteurization combined with the addition of sufficient common salt, e.g. 0% to about 10%, and 0% to about 0.7% of a preservative, eg. sorbic acid or sodium sorbate based on the aqueous phase.

Common salt may in any event be present to taste.

The presence of a part of the aqueous component in the continuous phase may be demonstrated in the products of the present invention by the behaviour of water-soluble dyestuffs admixed with the spread. The dyestuff taken up and no sharp boundary appears when a droplet of the dyestuff is added, in contrast to the behaviour of conventional margarine in which no diffusion of the dyestuff occurs at all.

A fat-soluble dyestuff on the other hand will not diffuse at all in the products of the invention under similar conditions.

The aqueous component may conform to the usual composition employed for this purpose in the manufacture of conventional margarine. Thus water, to which may be added other components, may be used, or whole milk, buttermilk or skim milk alone or diluted.

In the preparation of the products of the invention, the emulsifier system is usually first dispersed in the aqueous component, but if fat-soluble emulsifiers are used, these at least may first be dispersed in the fat component, which should be melted when added to the aqueous component. In preparing the emulsion the fat is added to the aqueous component. Care must be taken to avoid local excess of fat.

The aqueous component is preferably also heated before the addition of the fat to a temperature at which the fat is molten. The emulsion may be prepared batchwise or continuously, eg. in the manner in which mayonnaise is made industrially. It is highly desirable to provide adequate mixing, if necessary by placing more than one stirrer in the emulsifying vessel.

The emulsion may then be homogenized, preferably in such a way that the majority of the oil is in the form of droplets of 3 – 10 microns in diameter. This homogenization treatment may be carried out eg. by passing the emulsion through a colloid mill, a Willems reactron or a homogenization valve.

The emulsion obtained is then cooled at rest, eg. in tins or tubs, in contrast to the usual margarine and butter process, in which the emulsion is agitated, ie. in a churn or a scraped surface heat exchanger.

If one of the aforementioned dual-effect emulsifiers is used it may be mixed with either the fat or the aqueous component. The process comprises the steps of mixing from 0% to about 10% by weight, total emulsion basis, of a first emulsifier which has the property of stabilizing the emulsion, with an aqueous medium comprising water, skim milk, milk solids, and mixtures thereof to form an aqueous component preparing a fat as described hereinbefore in a molten state, mixing from 0% to about 1% by weight, total emulsion basis, of a second emulsifier having the property of effecting a partial destabilization of the product, with the fat to form a fatty component, then adding about 70 – 90 parts by weight of the fatty component with mixing, to about 10 – 30 parts by weight of the aqueous component, avoiding a local excess of the fat, and forming an emulsion having the fatty component as the disperse phase, then cooling the emulsion at rest to about 10°C to about −25°C until the percentage of solid crystallized material amounts to at least 5%. The first and second stabilizers, whether the same agent or a mixture, have both stabilizing and destabilizing properties, and are present as an emulsifier system in the total amount about 0.1% to about 10%, total emulsifier basis.

The food spreads provided by the present invention are plastic in composition, that is to say that while being spreadable they are sufficiently stable in shape to retain at ambient temperatures, ie. from 15°– 25°C, the shape of a mould in which they are prepared. While this characteristic does not require a high proportion of the fat to be crystallised, there must be from 5% to 30% crystallised, and preferably at least 10%, in order to establish a stable equilibrium in the product.

The emulsion after packing may be cooled by storage in a refrigerated chamber or by passage through a cold air blast. The temperature in the chilling space should preferably be from 10° to −25°C.

The cooling time required for obtaining the desired destabilisation degree may vary eg. from 45 minutes to 80 hours according to the conditions at which the cooling is effected.

The products of the invention exhibit a remarkable similarity to butter, especially in regard to their consistency, ie. plasticity and elasticity, which probably represent the most important properties contributing to the appeal of butter in its general handling qualities. The plasticity of a product can be ascertained by inserting a rod into the product and observing the degree of collar formation. It can also be ascertained by the fact that the product can be uniformly spread with a knife, this also being highly dependent on the hardness of the product. The elasticity can be expressed and measured by the elasticity modulus according to the method of Haighton described in "Chemisch Weekblad", No. 37, part 60 (1964), pages 508–511, and if the method is applied to a number of samples of butter and commercially availble margarine, it will be observed that for butter this modulus is about 5–20 × $10^6$ dyne/cm$^2$ and for a good quality table margarine about 30–130 × $10^6$ dyne/cm$^2$.

The invention will now be illustrated by the following examples. In all the examples products are described having a destabilisation degree of between 0.15 and 0.75. All parts and percentages described in the examples are by weight.

The degree of destabilisation of the products of the invention was calculated from relative electrical conductivity values of the spread and the emulsion from which it is prepared.

The similarity to butter can of course be enhanced by careful selection of flavouring agents, vitamins and other additives such as are used for this purpose in margarine.

Test for the determination of the relative conductivity in the food spread

A conductivity cell was inserted into a sample of the spread at 15°C. The cell comprised a pair of very thin metal electrodes, for which uncoated razor blades 0.05 mm in width have successfully been used. The electrodes were mounted on a plastic block at a distance of 35 mm, providing a cell constant of 0.21 cm$^{-1}$.

The conductivity cell was connected with a Wheatstone bridge (Philips PR 9500) and the specific conductivity was measured at a frequency of 1000 cycles/sec.

Using the same Wheatstone bridge, the specific conductivity of the aqueous phase was measured at a temperature of 15°C, with a conventional conductivity cell having two stainless steel electrodes, of a surface of 225 mm$^2$ and a cell constant of 0.27 cm$^{-1}$.

The relative conductivity of the food spread is:

$$\frac{\text{Specific conductivity food spread}}{\text{Specific conductivity aqueous phase}}$$

EXAMPLE 1

A fat composition was prepared by adding 0.5% of distilled partial glyceride esters of a mixture of palmitic and stearic acids containing 90% of monoglycerides and having an HLB value of 4.2 and minor proportions of colouring oils, vitamins and flavours to a fat blend consisting of:
  15 parts of sunflower oil
  35 parts of sunflower oil hardened to a slip melting point of 34°C.
  35 parts of coconut oil
  15 parts of palm oil hardened to a slip melting point of 45°C.
and having dilatation values of
  890 at 5°C.
  665 at 15°C.
  420 at 20°C.
  245 at 25°C.
  125 at 30°C.
  25 at 35°C.

An aqueous composition was prepared consisting of
  90 parts of skim milk containing 2.8% of casein
  8 parts of 10% sodium citrate solution
  2 parts of 8% citric acid solution The pH of the aqueous composition was 6.2, and about 2.35% of sodium caseinate was formed in situ, corresponding to 0.4% in the ultimately formed emulsion.

83 parts of the fat composition were melted by heating to a temperature of about 60°C. and slowly added to 17 parts of the aqueous composition, while stirring with a propeller stirrer in a jacketed vessel at 60°C., to form an oil-in-water emulsion. The emulsion formed was then homogenized in a colloid mill adjusted to a clearance of 0.6 mm and with an average circumferential speed of 11 m/sec.

The homogenized emulsion, in which 80% of the fat particles were in the range of 3 – 10 microns, was subjected to heat treatment for sterilisation for 15 sec. at 130°C. in a tubular heat exchanger and after cooling down to a temperature still above 70°C. was filled into miniature tubs each containing 250 grams which were heat-sealed with a lid under aseptic conditions.

After storage for 12 hours at 5°C. the product was assessed at 15°C., and showed the percentage of solid fat at this temperature of 30%. It also exhibited an excellent butter-like consistency and was cool and thin in the mouth. Colour diffusion tests showed that the product contained a continuous aqueous phase. The elasticity modulus was 18.5.10$^6$ dyne/cm$^2$. The product did not show appreciable collar formation, when a rod was inserted into a sample. The relative conductivity of the food spread obtained was 0.075, compared with 0.098 in the oil-in-water emulsion before cooling. The destabilisation degree of the product obtained was $$\frac{0.098 - 0.075}{0.098} = 0.24$$

and remained practically unchanged on storage at temperatures from 15°– 20°C. for a period of 4 weeks.

EXAMPLE 2

Example 1 was repeated with an aqueous composition consisting of:
  15 parts of fresh egg-yolk as the stabilising emulsifier 2 parts of sodium chloride
0.5 parts of potassium sorbate as a preservative and
72.5 parts of tap water and adjusted to pH 5.0 by adding lactic acid. The product showed no collar formation and had a pleasant, butter-like, mildly sour and salty taste. Its elasticity modulus was $12.10^6$ dyne/cm$^2$, and its destabilisation degree was initially 0.31 and after 4 weeks storage at 15°C. 0.39.

EXAMPLE 3

The process according to Example 1 was repeated with the exception that the aqueous composition contained 0.7% sorbic acid and was adjusted to pH 5.5 before emulsifying. In the homogenized emulsion was heat treated instead at 80°C. for 15 seconds for pasteurisation before cooling at rest.

The initial destabilisation degree of the product was 0.55 and remained practically unchanged during 4 weeks of storage at a temperature of from 15°- 20°C. The product practically showed no collar formation and was convenient to spread and these properties were not lost on storage at 15°- 20°C. for 4 weeks.

The elasticity modulus of the product was $12.5 \times 10^6$ dyne/cm$^2$.

EXAMPLE 4

Example 1 was repeated using the following fat blend:
  40 parts of sunflower oil
  35 parts of sunflower oil hardened to a slip melting point of 34°C.
  10 parts of coconut oil
  15 parts of palm oil hardened to a slip melting point of 45°C.
The blend had a dilatation of:
  710 at 5°C.
  545 at 15°C.
  430 at 20°C.
  275 at 25°C.
  140 at 30°C.
  25 at 35°C.

After sterilisation the emulsion was filled instead at a temperature of 75°C. into tins which were sealed and continuously transported through a cooling tunnel, in which each tin was subjected for three-fourth of an hour to a cold air blast having a temperature of −22°C. and a velocity of 3 m/sec.

At 15°C. the product did not show any collar formation, could be spread uniformly with a knife, and had a destabilisation degree of 0.57. The elasticity modulus of the product was $20 \times 10^6$ dyne/cm$^2$. After 4 weeks of storage both at refrigerator temperatures and at temperatures of from 15°- 20°C. these properties remained practically unchanged.

EXAMPLE 5

Example 1 was repeated except that the entire emulsifier system, including the monoglycerides present in the fat composition in Example 1, was contained in the aqueous composition, having the following components:
  50 parts of skim milk
  3 parts of the monoglycerides
  5 parts of decaglycerol monolaurate (HLB value 15.7) as the stabilising emulsifier
  40 parts of water.

The pH of the aqueous composition was about 6.4.

The destabilisation degree of the product was 0.40 and after 4 weeks storage at 15°C. 0.55. The product did not show appreciable collar formation and had a good elasticity represented by an elasticity modulus of $14.3 \times 10^6$ dyne/cm$^2$. These properties were retained on storage.

EXAMPLE 6

An emulsion was prepared as in Example 1 from 17.4 parts of the same aqueous phase and 82.6 parts by weight of a fat blend, consisting of 70 parts of molten butterfat and 30 parts of refined sunflower oil and containing the same proportion of the destabilising emulsifier as before. The fat blend had the following dilatation values:
  930 at 5°C.
  820 at 10°C.
  590 at 15°C.
  315 at 20°C.
  200 at 25°C.
  95 at 30°C.
  20 at 35°C.

The fat was dispersed at a temperature of 70°C. in the aqueous phase, and after the emulsion was homogenized in a Willems reactron high frequency generator 80 – 90% of the fat particles had a diameter of 3 – 10 microns.

The hot emulsion was filled at a temperature of 70°C. in pre-sterilised tubs which were then cooled for 12 hours at 5°C., and subsequently stored at 15°C.

Before and after a storage period of 4 weeks the samples were compared with butter and products of the same composition, but prepared by either a "phase inversion process" (as described in British Patent Specification No. 801,118) or a conventional "Votator process" as described in "Margarine" by Andersen and Williams, Pergamon Press (1965) page 248, in which the fat blend together with the aqueous phase is cooled and worked in a scraped surface heat exchanger for a residence time of about 6 seconds and subsequently fed for a residence time of 2 minutes into a resting tube.

|  | Butter | Product of the invention | Phase inversion product | Votator product |
|---|---|---|---|---|
| Hardness g/cm$^2$ at 5°C. | 2200 | 1550 | 1285 | 1820 |
| 10°C. | 1700 | 820 | 845 | 1200 |
| 15°C. | 1065 | 495 | 320 | 365 |
| 20°C. | 280 | 160 | too soft | 70 |
| Elasticity modulus ($10^6$ dyne/cm$^2$) | 18.0 | 20.0 | 23.2 | 25.6 |
| Destabilisation degree | > 0.99 | 0.44 | > 0.99 | > 0.99 |
| Collar formation | no | no | no | slight |
| Oil exudation (48 hours at 22°C.) | no | no | strong | strong |

After 4 weeks storage at 15°C. almost the same values were obtained for each of the three products. From the hardness values the spreadability of the product can be assessed according to Haighton J.Am.Oil Chem. Soc. 36 as 8,347 as follows:

<50 g/cm² = very soft to just pourable
50 – 100 = very soft, not spreadable
100 – 200 = soft, but already spreadable
200 – 800 = satisfactorily plastic and spreadable
800 – 1000 = hard, but satisfactorily spreadable
1000 – 1500 = too hard, limit of spreadability
<1500 = too hard.

The product of the invention thus has a better spreadability range as compared with the phase inversion product and the Votator product. Moreover it exhibited negligible oil exudation.

EXAMPLE 7

A food spread was prepared from 81.2 parts by weight of a fat blend and 17.8 parts by weight of an aqueous phase. The fat blend consisted of
40 parts of sunflower oil
30 parts of coconut oil
15 parts of sunflower oil hardened to a slip melting point of 34°C.
15 parts of an interesterified fat blend of 65 parts of fully hydrogenated palmkernel oil and 35 parts of fully hydrogenated palm oil.

The dilatation values of the fat blend were:
760 at 5°C.
715 at 10°C.
525 at 15°C.
325 at 20°C.
135 at 25°C.
45 at 30°C.

To this fat blend 0.5% by weight of the monoglycerides as used in Example were added, and also 25 mg/kg of $\beta$-carotene and flavours. The fat blend was dispersed at 70°C. in the same way as described in Example 1 in an aqueous composition consisting of:
90 parts of skim milk containing 2.8% of casein
6.3 parts of a 10% sodium citrate aqueous solution
3.7 parts of an 8% citric acid solution, providing 0.3% of the emulsion of sodium caseinate in situ and 10.0 parts of common salt. The pH of the aqueous phase was 6.5.

The oil-in-water emulsion obtained was filled at 70°C. in tubs and after a cooling period at rest of 12 hours at 5°C. a plastic product was obtained which was easily spreadable, quick melting in the mouth and did not show any collar formation. The salt impression of this product corresponded with that of a normal margarine having 1.5% of salt in the aqueous phase. The destabilisation degree was 0.33 and the elasticity modulus 15 × 10⁶ dyne/cm², which figures were retained after 4 weeks of storage at 20°C.

EXAMPLES 8 – 15

In these examples several food spreads were prepared from an emulsion of 82 parts of a fat blend dispersed in 18 parts of an aqueous composition, containing a nonionic emulsifier system for stabilising the emulsion during preparation and homogenisation. The fat blend consisted of:
10 parts of sunflower oil
15 parts of soybean oil, slightly hydrogenated (I.V. 98)
25 parts of coconut oil
10 parts of palmkernel oil
5 parts of palm oil hardened to a melting point of 45°C.
35 parts of sunflower oil hardened to a melting point of 35°C.

The dilatation values of this blend were:
900 at 5°C.
800 at 10°C.
650 at 15°C.
375 at 20°C.
200 at 25°C.

The aqueous composition consisted of:
50 parts of skim milk
3 parts of the partial glyceride esters, used in Example 1 as a destabilising emulsifier.
5 parts of a nonionic emulsifier
40 parts of water The pH of the aqueous phase was 6.5.

The total 19 nonionic emulsifiers were compared, out of which 8 emulsifiers were selected, all having HLB values of from 12–18, as being suitable for use in the invention as stabilising emulsifiers. The emulsions were prepared as described in Example 1 and filled at 70°C. into tubs, which were then sealed and cooled for 12 hours at a temperature of 5°C. The plastic properties and the destabilisation degree of the products according to the invention were almost completely retained after a storage period of 4 weeks at a temperature of 15°– 20°C. Further details are shown in the accompanying Table 1.

EXAMPLE 16 – 21

Several food spreads were prepared in these examples from an emulsion comprising 80 parts of a fat blend containing 1% by weight of a nonionic destabilising emulsifier and dispersed in 20 parts of an aqueous composition in which 0.4% of sodium caseinate based on the total emulsion was formed in situ as the stabiliser emulsifier. The fat blend consisted of:
35 parts of sunflower oil
10 parts of palm oil hardened to a slip melting point of 45°C.
20 parts of coconut oil
35 parts of sunflower oil hardened to a slip melting point of 35°C.

The dilatation values of the fat blend were:
860 at 5°C.
760 at 10°C.
650 at 15°C.
450 at 20°C.
250 at 25°C.

The aqueous composition consisted of 90 parts by weight of skim milk containing 2.8% of casein, 8 parts of a 10% aqueous sodium citrate solution and 2 parts of a 8% citric acid solution.

The pH of the aqueous phase was 6.2.

The spread was prepared as described in Example 1.

The samples obtained were tested at 15°C. the next day and after 4 weeks storage at 15°– 20°C.

In total 17 nonionic emulsifiers were compared. The results are shown in the accompanying Table II, from which it is clear that a satisfactory product is obtained in accordance with the invention from destabilising nonionic emulsifiers having an HLB value within the ranges 3.5 – 7.0 or 11.0 – 18.0, and based on saturated fatty acids having 16 – 24 carbon atoms.

EXAMPLE 22

Food spreads were prepared as described in Example I containing 80% of the same fat blend and the same proportion of monoglyceride destabilising emulsifier and 20% of an aqueous composition, consisting of
90 parts of skim milk containing 2.8% of casein.
7 parts of a 10% sodium citrate solution
3 parts of an 8% citric acid solution to produce 0.35% of caseinate as stabilising emulsifier in situ. The pH of the aqueous phase was 5.85.

The emulsion was divided into three portions and the degree of destabilisation of each sample was measured after storage at 10, 15 and 20°C. for 72 hours and then for 1, 2, 3 and 4 weeks at these temperatures.

Three further samples were prepared in the same way, except that no destabilising emulsifier was added. The results are summarised in Table III. From the Table it appears that the products according to the invention retained the required destabilisation degree even after prolonged storage at ambient temperature. They were superior in butter-like consistency throughout as compared with the products without destabilising emulsifier, and did not show appreciable collar formation, or loose moisture.

EXAMPLE 23

An emulsion was prepared as in Example 1 from 17.8 parts of the same aqueous composition as used in Example 3 and 82.2 parts by weight of a fat blend containing the same proportion of the monoglyceride destabilising emulsifier as before. The fat blend consisted of:
70 parts of sunflower oil
15 parts of sunflower oil hardened to a slip melting point of 34°C.
15 parts of an interesterified fat blend of 65 parts of fully hydrogenated palmkernel oil and 35 parts of fully hydrogenated palm oil.

The fat blend had the following dilatation values:
450 at 5°C.
405 at 10°C.
315 at 15°C.
235 at 20°C.
145 at 25°C.
70 at 30°C.
15 at 35°C.

The amount of polyunsaturated fatty acids in the fat blend was 41.5%.

The homogenized emulsion was filled at a temperature of 70°C. into pre-sterilised tubs, which were cooled for 12 hours at 5°C. and subsequently sealed and stored at 10°C. The fresh product did not show any collar formation and had an elasticity modulus of $12.5 \times 10^6$ dyne/cm$^2$. It was also easily spreadable with a knife, even at 10°C., because the hardness value at this temperature was only 560 g/cm$^2$.

The destabilisation degree was 0.36.

After 4 weeks storage both at 10°C. and at 15°C. no substantial change in the consistency was observed, and the destabilisation degree was 0.44.

EXAMPLE 24

The process of Example 1 was repeated, except that the emulsion was made from a different aqueous composition and contained only one emulsifier to perform both functions of stabilising the emulsion during preparation and destabilising the food spread.

The aqueous composition consisted of:
50 parts of skim milk
5 parts of polyoxyethylene (5) monostearate
45 parts of water.

The pH of the aqueous composition was about 6.3. The destabilisation degree was 0.47 and after 4 weeks at 15°C. 0.58.

The product was easy to spread at room temperature, did not show collar formation and the elasticity modulus was $18.2 \times 10^6$ dyne/cm$^2$. These properties were retained on storage.

EXAMPLE 25

The process of Example 24 was repeated, except that 5 parts of polyoxyethylene (2) monostearylether were added to the aqueous component as the emulsifier system.

The degree of destabilisation of the fresh product was 0.25 and after 4 weeks storage at 15°C. 0.40.

The product was easy to spread at room temperature did not show any collar formation and the elasticity modulus was $17.5 \times 10^6$ dyne/cm$^2$, which properties were retained on storage.

EXAMPLE 26

The process of Example 1 was repeated, except that the emulsion was made from a different aqueous composition containing 10 parts of a partial citric acid ester of monoglycerides derived from soybean oil fatty acids.

The aqueous phase was adjusted by 1 N sodium hydroxide to a pH of 6.5.

The destabilisation degree of the fresh product was 0.23 and after 4 weeks' storage at 15°–20°C. 0.36.

The product was easily spread at room temperature, did not show any collar formation and had an elasticity modulus of $15.3 \times 10^6$ dyne/cm$^2$. These properties were retained on storage.

TABLE I

Preparation and Properties of Food Spreads containing Nonionic Emulsifiers

| Example | Emulsifier | HLB value | emulsion preparation possible? | collar formation 5° | collar formation 15° | plasticity 5° | plasticity 15° | loose moisture 5° | loose moisture 15° | elasticity 15° | destabilization degree at 15–20°C |
|---|---|---|---|---|---|---|---|---|---|---|---|
| 8 | decaglyceryl monolaurate | 15.7 | Yes | None | None | Mod. | Good | Mod. | Mod. | Good | 0.35 |
| — | decaglyceryl dioleate | 11.2 | No | | | Emulsion coarsens after homogenization | | | | | — |
| — | decaglyceryl tristearate | 9.0 | No | | | Emulsion breaks on preparation | | | | | — |
| — | triglyceryl monoester of shortening | 9.3 | No | | | " | | | | | — |
| — | triglyceryl hexanoate | — | No | | | " | | | | | — |
| — | triglyceryl monostearate | 8.8 | No. | | | " | | | | | — |
| — | triglyceryl monodistearate | 5.2–8.8 | No | | | Emulsion coarsens after homogenization | | | | | — |
| — | hexaglyceryl octanoate | — | Yes | considerable | | Poor | Poor | Good | | Bad | 1 |
| — | hexaglyceryl distearate | 8.6 | No | | | Emulsion coarsens after homogenization | | | | | — |
| 9 | decaglyceryl monolaurate | 15.7 | Yes | None | None | Poor | Mod. | Mod. | Good | Good | 0.48 |
| 10 | decaglyceryl dilaurate | 12.9 | Yes | None | None | Poor | Good | Mod. | Good | Good | 0.52 |
| — | decaglyceryl distearate | 11.2 | No | | | Emulsion coarsens after homogenization | | | | | — |

TABLE I-continued

Preparation and Properties of Food Spreads containing Nonionic Emulsifiers

| Example | Emulsifier | HLB value | emulsion preparation possible? | collar formation 5° | collar formation 15° | Visual Assessment plasticity 5° | plasticity 15° | loose moisture 5° | loose moisture 15° | elasticity 15° | destabilization degree at 15-20°C |
|---|---|---|---|---|---|---|---|---|---|---|---|
| — | polyglyceryl ester of higher saturated fatty acids | — | No. | Emulsion breaks on preparation | | | | | | | — |
| 11 | polyoxyethylene (20) sorbitan monolaurate | 16.7 | Yes | None | None | Good | Good | Some | Some | Good | 0.29 |
| — | polyoxyethylene (7.5) monostearate | 11.1 | No | Emulsion breaks on preparation | | | | | | | — |
| 12 | polyoxyethylene (40) monostearate | 16.9 | Yes | None | None | Mod. | Good | Good | Mod. | Good | 0.40 |
| 13 | polyoxyethylene (50) monostearate | 17.9 | Yes | None | None | Good | Good | Some | Mod. | Good | 0.39 |
| 14 | stearyl alcohol (20) ethylene oxide ether | 15.4 | Yes | None | None | Mod. | Good | None | Some | Good | 0.52 |
| 15 | polyoxyethylene (7.5) monostearate + polyoxyethylene (50) monostearate | 14.5 | Yes | None | None | Mod. | Good | Mod. | Mod. | Good | 0.37 |

TABLE II

| Example | Emulsifier | HLB values Calculated | HLB values Stated | Destabilization degree next day | Destabilization degree after 4 weeks | Visual assessment at 15°C Collar formation | Loose moisture | Elasticity | Plasticity |
|---|---|---|---|---|---|---|---|---|---|
| | blank | — | — | 0.46 | 1 | high | very bad | bad | very bad |
| 16 | glyceryl monobehenate | 3.6 | | 0.48 | 0.52 | none | good | good | good |
| 17 | glyceryl monostearate | 4.1 | | 0.39 | 0.42 | none | good | very good | very good |
| | glyceryl monooleate | 4.2 | | 0.47 | >0.99 | high | very bad | bad | very bad |
| | glyceryl monolaurate | 5.3 | | 0.67 | 1 | high | very bad | bad | very bad |
| | partial polyglyceryl ester of tallow fatty acids | 6.6 | | | | emulsion failed | | | |
| | partial polyglyceryl ester of shortening | 9.3 | | | | '' | | | |
| | partial polyglyceryl ester of stearic acid | 9.0 | | | | '' | | | |
| | partial polyglyceryl ester of oleic acid | 8.6 | | | | '' | | | |
| | partial polyglyceryl ester of lauric acid | 15.7 | | 0.55 | 1 | high | bad | bad | very bad |
| | ethyleneglycerylmonostearate | 2.7 | | 0.47 | 1 | high | very bad | bad | very bad |
| | propyleneglycerylmonostearate | 3.4 | | | | none | bad | bad | very bad |
| | saccharose monostearate | 7.7 | | | | emulsion failed | | | |
| | sorbitan monolaurate | | 8.6 | 0.50 | >0.99 | slight | bad | good | moderate |
| 18 | sorbitan monopalmitate | | 6.7 | 0.71 | 0.72 | none | good | good | rather good |
| 19 | sorbitan monostearate | | 4.7 | 0.71 | 0.69 | none | good | good | good |
| | sorbitan monooleate | | 4.3 | 0.52 | 1 | slight | very bad | too soft | bad |
| 20 | polyoxyethylene (20) sorbitan monostearate | | 14.9 | 0.40 | 0.52 | none | good | good | good |

Table III

| | | After Cooling Destabilising Degree | | | | |
|---|---|---|---|---|---|---|
| Cooling temperature °C. | | fresh | 1 week | 2 weeks | 3 weeks | 4 weeks |
| 10 | Destabiliser | 0.26 | 0.26 | 0.29 | 0.32 | 0.32 |
| | No destabiliser | 0.19 | 0.83 | 0.91 | 0.92 | 1.00 |
| 15 | Destabiliser | 0.18 | 0.18 | 0.21 | 0.25 | 0.39 |
| | No destabiliser | 0.31 | 0.71 | 0.86 | 0.91 | 1.00 |
| 20 | Destabiliser | 0.18 | 0.18 | 0.23 | 0.23 | 0.24 |
| | No destabiliser | 0.64 | 0.68 | 0.86 | 0.92 | 1.00 |

What is claimed is:

1. A process for preparing margarine or margarine-like plastic fatty emulsion food spread resembling butter in consistency and containing an emulsifier or an emulsifier system exhibiting both stabilizing and destabilization functions comprising the steps of:

a. preparing an aqueous phase from the group consisting of water, skim milk, an aqueous phase containing milk solids and mixtures thereof with an effective amount of up to about 10% by weight of the spread of a stabilizing emulsifier to stabilize the emulsion during homogenization as well as any heat treatment;

b. preparing a molten fat, said fat having a dilatation value at 25°C of about 100 to 400 mm³/25g;

c. preparing a fatty phase by mixing with said molten fat an effective amount of up to about 1% by weight of the spread of a destabilization emulsifier to maintain the final food spread in a destabilized condition;

d. dispersing 70 to 90 parts by weight of said molten fatty phase in 10 to 30 parts by weight of said aqueous phase and forming an emulsion wherein the fatty phase is the dispersed phase; and e. cooling said emulsion while at rest to a temperature between 10°C and −25°C until the percentage of solid crystallized material amounts to at least 5% to form the spread, and wherein during said cooling step there is effected a destabilization of said spread to a degree of 0.15 to 0.75 whereby there is distributed in the dispersed phase a proportion of the aqueous component being measured by a decrease in electrical conductivity of the product, said decrease being not less than 5% and not more than 80% of the electrical conductivity of said emulsion prior to crystallization, said emulsifier or emulsifier system having stabilizing and destabilizing properties, being present in an amount of from about 0.1% to about 10% by weight of the total emulsion.

2. A process according to claim 1 wherein the said stabilizing emulsifier is a proteinaceous colloid selected from the alkaline salts of phospho-proteins and complexes of phosphatides with phospho-proteins, and the said destabilizing emulsifier is selected from monoglycerides having an HLB factor from 3.5 to 7.0.

3. A process according to claim 1 wherein the said stabilizing emulsifier is selected from egg yolk and sodium caseinate, and the said destabilizing emulsifier is selected from monoglycerides of palmitic and stearic acid.

* * * * *